United States Patent
Brown et al.

(10) Patent No.: US 7,567,951 B2
(45) Date of Patent: Jul. 28, 2009

(54) METHOD AND COMPUTER-READABLE MEDIUM FOR PROVIDING ACCESS TO POLICY INFORMATION ASSOCIATED WITH ELECTRONIC MAIL MESSAGE FOLDERS

(75) Inventors: Kevin L. Brown, Woodinville, WA (US); Jason M. Cahill, Woodinville, WA (US); Sangeetha Sangeetha, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 276 days.

(21) Appl. No.: 11/077,446

(22) Filed: Mar. 10, 2005

(65) Prior Publication Data

US 2006/0206451 A1    Sep. 14, 2006

(51) Int. Cl.
*G06F 7/00* (2006.01)
(52) U.S. Cl. .......................................................... 707/2
(58) Field of Classification Search ...................... 707/2
See application file for complete search history.

(56) References Cited

U.S. PATENT DOCUMENTS

2004/0039594 A1* 2/2004 Narasimhan et al. ........... 705/1

OTHER PUBLICATIONS

Bernheim et al., Notification of Shared Annotation of Digital Documents, Apr. 20-25, 2002 ACM Press, vol. 4, Issue No. 1, p. 93.*
Brush et al, "Notification for Shared Annotation of Digital Documents", Apr. 2002, ACM, CHI 2002, vol. 4, Issue 1, p. 89-96.*

* cited by examiner

*Primary Examiner*—Charles Rones
*Assistant Examiner*—Fazlul Quader
(74) *Attorney, Agent, or Firm*—Merchant & Gould

(57) ABSTRACT

A method and computer-readable medium are provided for accessing policy information associated with e-mail folders. According to the method, a user interface is provided that allows a user to navigate between one or more folders for storing data, such as e-mail folders. A selection of one of the e-mail folders may be received through the user interface. In response to the selection, a determination is made as to whether the selected folder is an organizational folder. If the selected folder is an organizational folder, an organizational policy statement associated with the selected folder is displayed within the user interface. The organizational policy statement may comprise data identifying a retention period for e-mail messages stored in the e-mail folder, data identifying the e-mail folder, data identifying an intended use for the e-mail folder, and a selectable link that may be utilized to access additional information regarding the organizational policy statement.

17 Claims, 5 Drawing Sheets

METHOD AND COMPUTER-READABLE MEDIUM FOR PROVIDING ACCESS TO POLICY INFORMATION ASSOCIATED WITH ELECTRONIC MAIL MESSAGE FOLDERS

BACKGROUND OF THE INVENTION

Modem business organizations are subject to a greater degree of regulatory scrutiny than ever before. Regulatory agencies such as the Securities and Exchange Commission ("SEC") impose specific reporting and record keeping requirements on certain classes of businesses. For instance, the record keeping requirements may specify the length of time certain categories of documents must be maintained. Records may be kept longer than the specified time, but cannot be destroyed earlier than the specified time period. As an example, certain types of documents must be retained for a minimum of seven years. These requirements apply to electronic communications, such as electronic documents and electronic mail ("e-mail") messages, in addition to paper documents.

Despite the regulatory requirements for maintaining documents, business organizations have a strong need to legally destroy documents. This need stems primarily from the extremely large volume of space occupied by both printed and electronic records. In order to balance the burden of maintaining documents in a manner compliant with regulatory requirements and the need to legally destroy documents, companies often define a paperwork retention schedule. A paperwork retention schedule is typically defined by a company's records manager. The paperwork retention schedule defines the period of time that various classes of documents should be retained for. For example, a paperwork retention schedule may indicate that all contracts should be destroyed after seven years. A paperwork retention schedule may be applied to both physical and electronic documents, such as e-mail messages.

In order to apply a paperwork retention schedule to e-mail messages, a policy may be defined by an organization and implemented at an e-mail server computer that specifies how long different categories of e-mail messages should be retained for. Policies may also be specified that define now certain categories of e-mail messages should be preserved and copied to an electronic storage vault. These policies are typically implemented by applying the policies to e-mail messages stored in folders on an e-mail server computer.

Although e-mail policies are helpful in assisting users in filing and maintaining e-mail messages for a specified period of time, one complication in utilizing such policies is that it is often difficult for users to determine the policy that applies to a particular mail folder. Typically, the user finds out that a policy exists only after the policy has been broken and some action is needed by the user to rectify the error. The user cannot preemptively take action with respect to the policy because the user does not know what action is required. This can be particularly frustrating for users of e-mail systems that utilize e-mail related policies.

It is with respect to these considerations and others that the various embodiments of the present invention have been made.

BRIEF SUMMARY OF THE INVENTION

In accordance with the present invention, the above and other problems are solved by a method and computer-readable medium for providing access to policy information associated with e-mail folders. Through the use of the embodiments of the invention, users of e-mail systems having policies applied to e-mail folders can quickly and easily learn of the existence of a policy, learn what the policy is, and be directed to additional information regarding the application of the policy.

According to one aspect of the invention, a method is provided for accessing policy information associated with an e-mail folder. According to the method, a user interface is provided that allows a user to navigate between one or more folders for storing data, such as e-mail folders. A selection of one of the e-mail folders may be received through the user interface. In response to the selection, a determination may be made as to whether the selected folder is an organizational folder. An organizational folder is a folder that has a policy applied to it. The organizational folder may include an organizational policy statement that describes the policy applied to the folder, a collection of policies enforced at an e-mail server computer, and the ability for users to create sub-folders. If the selected folder is an organizational folder, the organizational policy statement associated with the selected folder is displayed within the user interface.

According to an embodiment of the invention, the organizational policy statement may be defined by an organization and supplied to the e-mail server computer by a system administrator. Moreover, according to an embodiment, the organizational policy statement may comprise data identifying a retention period for e-mail messages stored in the e-mail folder. The organizational policy statement may also include data identifying the e-mail folder, data identifying an intended use for the e-mail folder, and a selectable link that may be utilized to access additional information regarding the organizational policy statement.

According to another embodiment of the invention, an indicator may be displayed within the user interface for each organizational folder. The indicator is displayed in a manner to differentiate the organizational folders from other types of e-mail folders. According to other embodiments of the invention, a user interface object may also be provided within the user interface for minimizing and maximizing the display of the organizational policy statement. When minimized, an indication may be received that a mouse cursor is hovering over the user interface object. In response to receiving the indication, the organizational policy statement may be displayed. The organizational policy statement may also be displayed if a sub-folder of the selected organizational folder is selected.

According to another embodiment of the invention, a computer-readable medium is provided that includes computer-readable instructions which, when executed by a computer, cause a computer to provide a user interface for displaying an organizational policy statement associated with an e-mail folder. In particular, a user interface is provided that is operative to receive the selection of a user interface object corresponding to an organizational e-mail folder. In response to the selection of the user interface object, the organizational policy statement associated with the selected organizational e-mail folder is displayed. The organizational policy statement may include data identifying a retention period for e-mail messages stored in the folder, data identifying the e-mail folder, data identifying an intended use for the e-mail folder, a selectable link to additional information regarding the folder, and other information.

According to other embodiments, the computer-executable instructions are operative to display the user interface object corresponding to the organizational e-mail folder in a manner that differentiates the user interface object from other user interface objects corresponding to other types of e-mail folders. The computer-executable instructions may also be operative to receive a selection of a sub-folder of the organizational e-mail folder and to display the organizational policy statement in response to the selection of the sub-folder. User interface objects may also be provided for minimizing and maximizing the display of the organizational policy statement.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
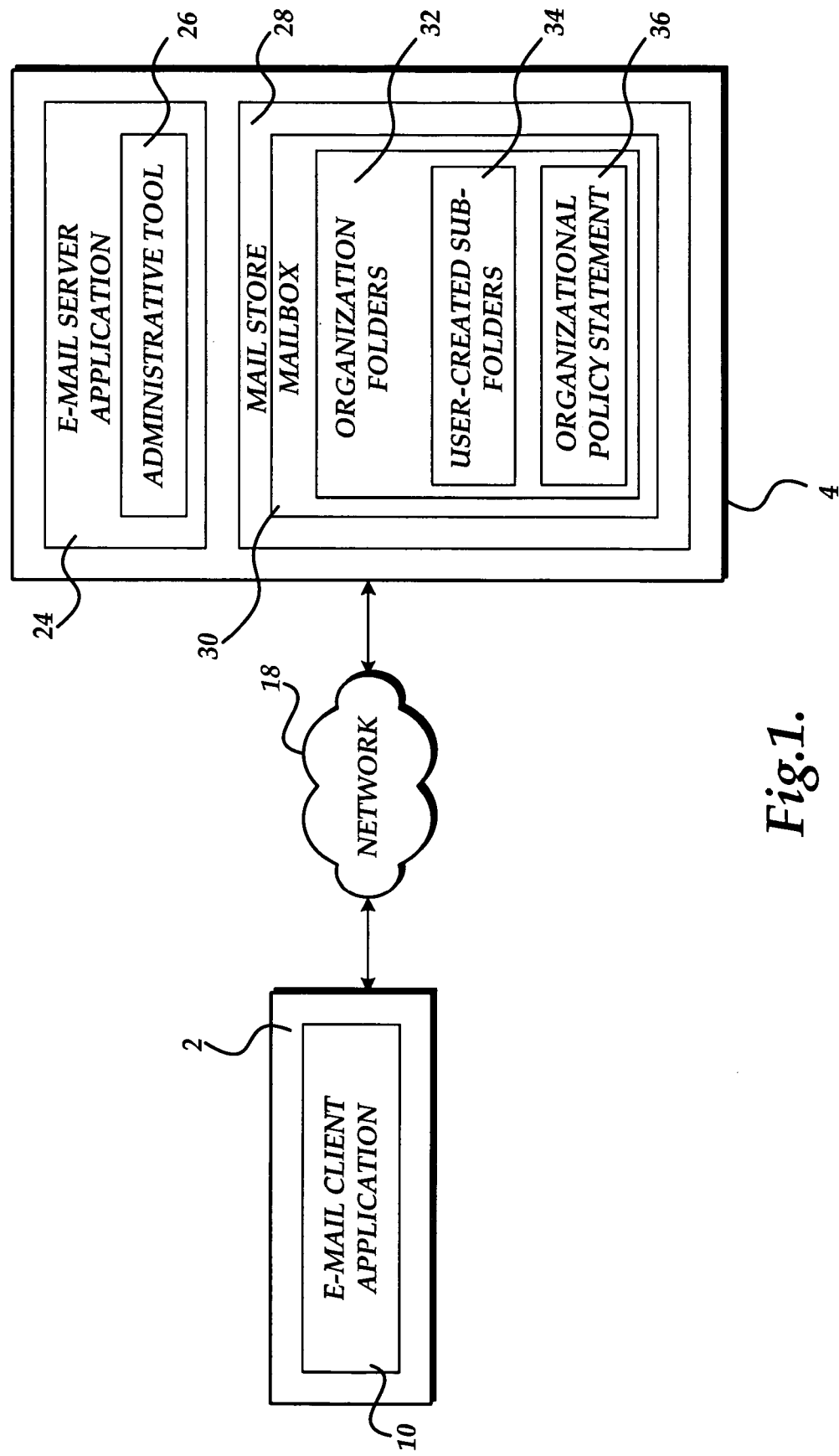
FIG. 1 is a network diagram illustrating aspects of several networked computer systems utilized in the various embodiments of the invention.

Referring now to the drawings, in which like numerals represent like elements, various aspects of the present invention will be described. In particular, FIGS. 1-2 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, a network diagram will be described illustrating aspects of several networked computer systems utilized in the various embodiments of the invention. In particular, as shown in FIG. 1, aspects of the invention may utilize a client computer 2 and a server computer 4. The client computer 2 comprises a standard desktop, laptop, or handheld computer operative to execute an e-mail client application 10. Through the e-mail client application 10, a user of the client computer 2 can send and receive electronic mail ("e-mail") messages through an e-mail server computer, such as the server computer 4.

As illustrated in FIG. 1, the client computer 2 can communicate with the server computer 4 through a network 18, such as a local area network or a wide area network like the internet. The server computer 4 is operative to execute an e-mail server application 24 that provides e-mail server capabilities. In particular, the e-mail server application 24 is operative to maintain a mail store 28 for storing e-mail messages and other data for users of the server computer 4. For instance, a mailbox 30 may be maintained for each user of the e-mail server application 24. Each mailbox 30 contains various folders and e-mail messages may be stored within the folders. A user may access the contents of the mailbox 30 utilizing the e-mail client application 10 to read and organize messages, to create folders and sub-folders, and may even be permitted to create sub-folders 34 of an organizational folder 32.

According to one embodiment of the invention, the e-mail server application 24 may include an administrative tool 26 for administering the settings and operation of the e-mail server application 24. In particular, according to one embodiment of the invention, the administrative tool 26 may provide functionality for defining one or more organizational e-mail folders 32 for users of the e-mail server application 24. The organizational folders 32 are special e-mail folders that have one or more policies applied to their contents. For instance, a policy may be defined for an organizational folder relating to the amount of time e-mail messages within the folder should be retained. These policies are typically defined by the organization operating the server computer 4.

Other policies may also be defined regarding preservation of the contents of an organizational e-mail folder, archiving of items within a folder, and other actions. Policies may also effect the possible actions that may be performed on an organizational folder. For instance, the policy may specify that a folder cannot be moved, deleted, or renamed. Moreover, organizational folders 34 may be provisioned for each user based upon aspects of the user's employment. In this manner, managers may be provisioned with different organizational folders than their subordinates, etc.

According to other aspects of the invention, the administrative tool 26 may allow an administrator of the server 4 to specify an organizational policy statement 36 for each of the organizational folders 36. The organizational policy statement 36 comprises a description of the policy applied to an organizational folder 34. In particular, according to embodiments of the invention, an organizational policy statement 36 may comprise data identifying the organizational folder 36, data identifying a retention period for items stored within the organizational folder 36, data identifying an intended use for the organizational folder 36, and may include a network address directed toward additional information regarding the organizational policy statement. Other information may also be provided. As will be described in greater detail below with respect to FIGS. 2-5C, the e-mail client application 10 is operative to provide a user interface that allows a user to easily access and view the organizational policy statement 36 for each organizational folder 32.

Figure 2:
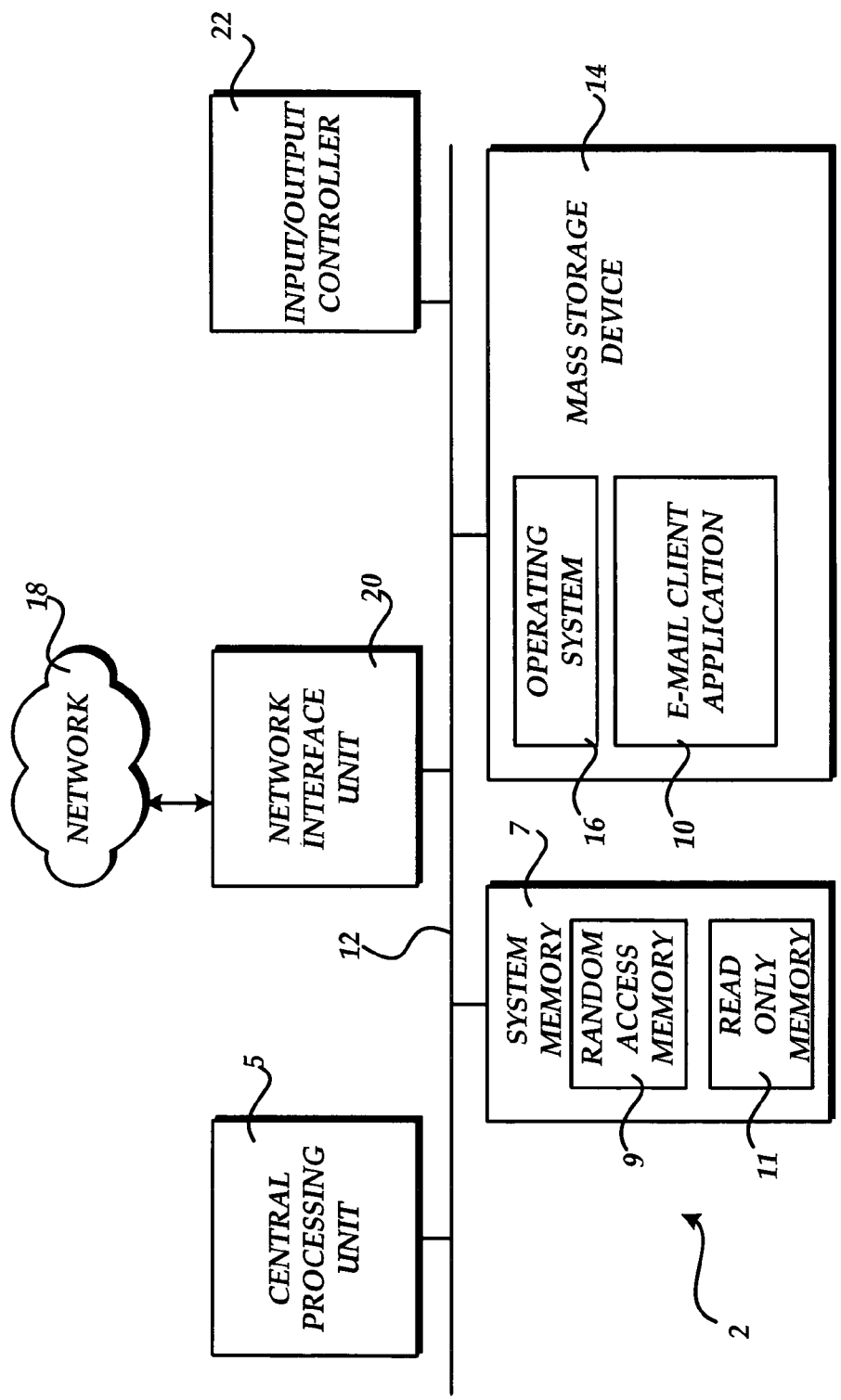
FIG. 2 is a computer system architecture diagram illustrating a computer system utilized in and provided by the various embodiments of the invention.

Referring now to FIG. 2, an illustrative computer architecture for a computer 2 utilized in the various embodiments of the invention will be described. The computer architecture shown in FIG. 2 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 2). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store an e-mail client application 10. As described briefly above, the e-mail client application 10 is operative to provide functionality for sending and receiving e-mail messages through the e-mail server computer 4. As also described in greater detail herein, the e-mail client application 10 is further operative to provide a user interface that allows a user to easily access and view the organizational policy statements for each organizational folder within a user's mailbox.

According to one embodiment of the invention, the e-mail client application 10 comprises the OUTLOOK personal information manager application from MICROSOFT CORPORATION of Redmond, Wash. It should be appreciated, however, that the various embodiments of the invention may be utilized with e-mail client applications from other vendors. It should further be appreciated that the embodiments described herein may be implemented with any program that is operative to provide an interface to data stored in folders to which a policy may be applied.

It should be appreciated that the server computer 4 may include some or all of the conventional computing components illustrated in FIG. 2. It should also be appreciated that the server computer 4 may execute an operating system suitable for operating a server computer. Moreover, the server computer 4 may also execute the e-mail server application 24 and the administrative tool 26 illustrated in FIG. 1. According to one embodiment of the invention, the e-mail server application 24 comprises the EXCHANGE e-mail server application from MICROSOFT CORPORATION of Redmond, Wash. It should be appreciated, however, that the various embodiments of the invention may be utilized with e-mail server applications from other vendors.

Figure 3:
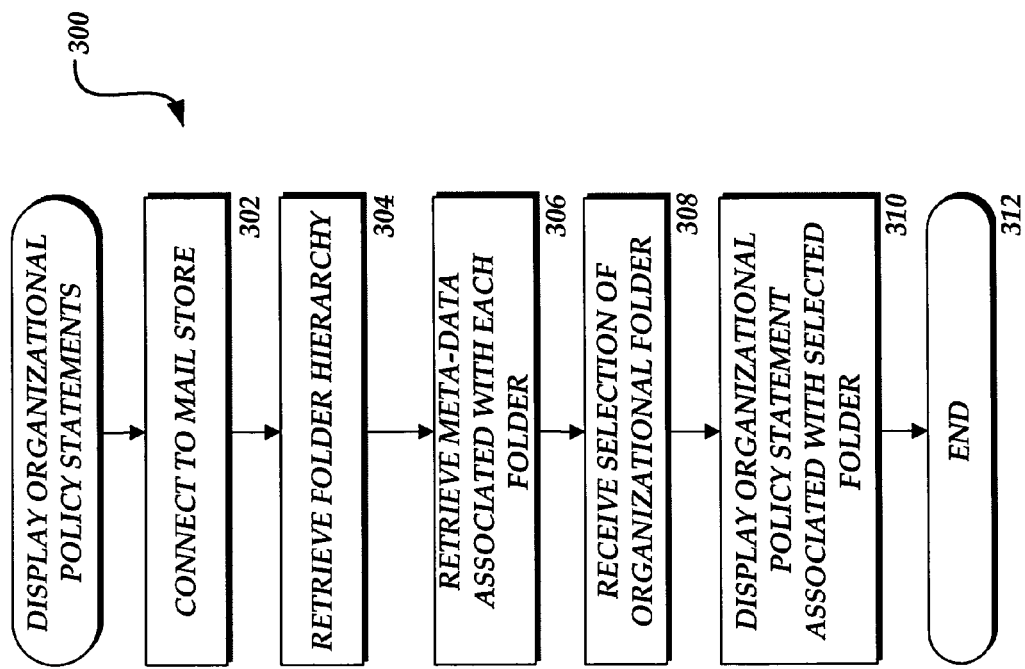
FIG. 3 is a flow diagram showing an illustrative routine for displaying organizational policy statements according to one embodiment of the invention.

Referring now to FIG. 3, an illustrative routine 300 will be described illustrating a process performed by the e-mail client application 10 for providing access to policy information associated with an e-mail folder. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 3, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 300 begins at operation 302, where the e-mail client application 10 communicates with the e-mail server application 24 to connect to the mail store 28. Once a connection to the mail store 28 has been established, the e-mail client application 10 requests the folder hierarchy of the mailbox 30 for the user. The folder hierarchy may include one or more fixed folders, such as an inbox, deleted items folder, sent items folder, and other folders typically associated with all users of the e-mail server application 24. The folder hierarchy may also include one or more organizational folders 32. The folder hierarchy may also include user created folders. According to an embodiment of the invention, the folder hierarchy may include user-created sub-folders 34 of an organizational folder. The policies applied to the parent organizational folder are also applied to any user-created sub-folders 34 of the folder.

Once the e-mail client application 10 has retrieved the folder hierarchy for the user, the routine 300 continues to operation 300 where meta-data for each of the folders in the hierarchy are retrieved from the mail store 28. With respect to the meta-data for an organizational folder, data may be provided that indicates that the folder is an organizational folder, that indicates whether the folder can be deleted by the user, and that provides the name of the organizational policy applied to the folder. The organizational policy statement 36 for the folder may also be provided. According to an embodiment, meta-data may also be provided that indicates whether or not the organizational policy statement may be minimized by a user. Other meta-data regarding the folder may also be provided.

From operation 306, the routine 300 continues to operation 308, where the e-mail client application 10 receives from a user the selection of a user interface object corresponding to an e-mail folder. If the selected e-mail folder comprises an organizational folder, the routine 300 continues to operation 310, where the organizational policy statement 36 for the selected folder is displayed to the user. An illustrative user interface for selecting an e-mail folder, displaying the organizational policy statement, and minimizing and maximizing the organizational policy statement are described below with respect to FIGS. 4 and 5A-5C. From operation 310, the routine 300 continues to operation 312, where it ends.

Figure 4:
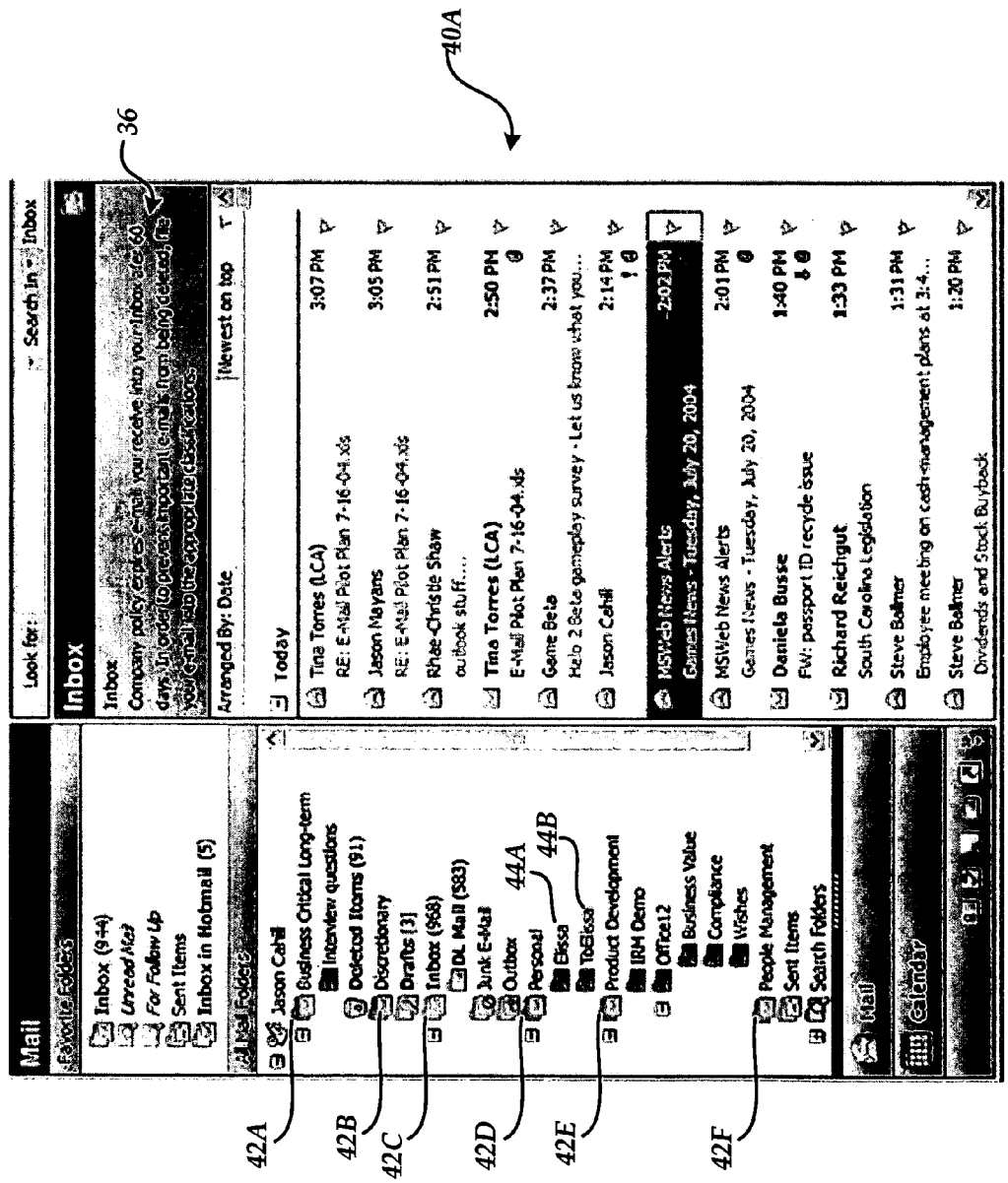
FIGS. 4-5C are user interface diagrams showing aspects of an illustrative user interface provided by the various embodiments of the invention.

Turning now to FIG. 4, aspects of an illustrative user interface provided by the e-mail client application according to one embodiment of the invention will be described. As shown in FIG. 4, the e-mail client application 10 provides a user interface 40A for navigating among one or more e-mail folders, for viewing e-mail messages, and for performing other tasks with respect to the messages. According to one embodiment of the invention, the e-mail client application 10 is operative to display indicators 42A-42F for each organizational folder 32 that differentiates the organizational folders from other types of e-mail folders. In this manner, a user can easily visualize that an organizational folder is different from other types of folders. For instance, in FIG. 4, the icons for the organizational folders 42A-42F are different from the icons for the user-created subfolders 44A-44B.

According to other aspects of the user interface provided by the e-mail client application 10, when an organization folder or a sub-folder of an organizational folder is selected by a user, the e-mail client application 10 is operative to display the organizational policy statement 36 associated with the selected folder. The display provided by the e-mail client application may identify the folder, identify the retention period for the folder, and identify an intended use for the folder. Although not illustrated in FIG. 4, the e-mail client application 10 may also display a selectable link to additional information regarding the organizational policy statement associated with the selected folder. This information may be displayed within the e-mail client application, within a web browser, or from another program external to the e-mail client application.

Figure 5A:
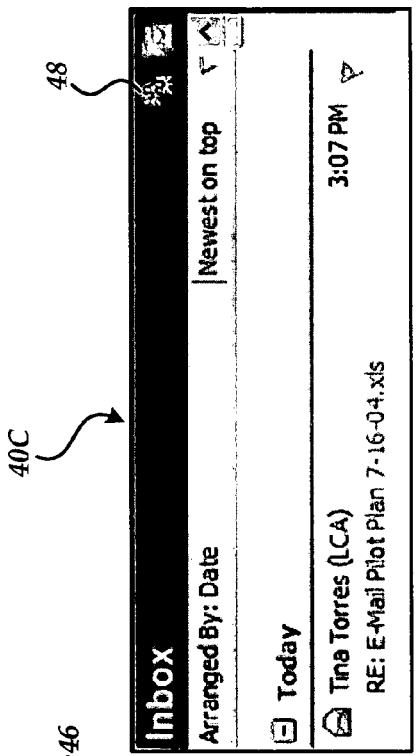
Figure 5B:
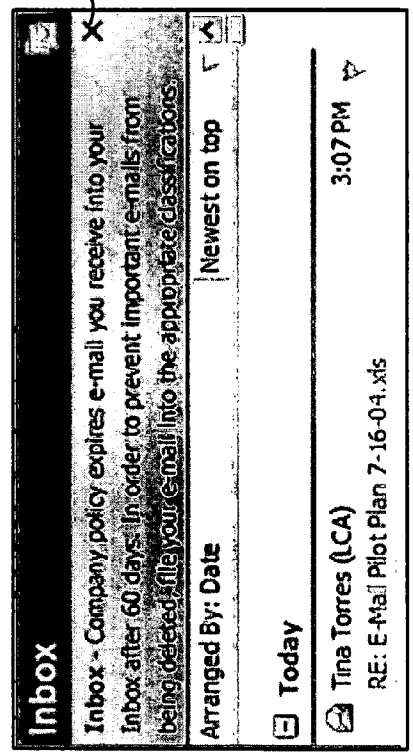
Figure 5C:
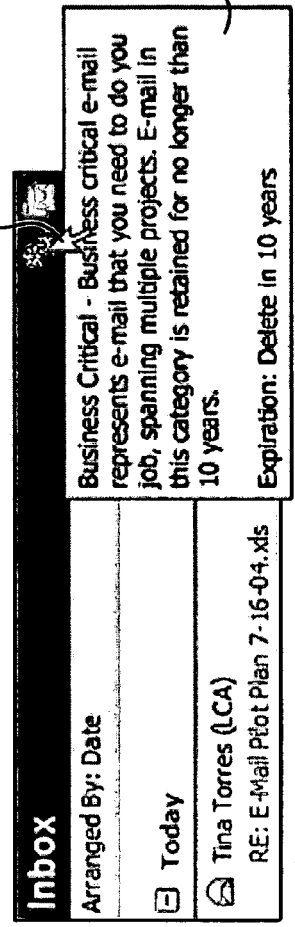

Referring now to FIGS. 5A-5C, additional aspects of the user interface provided by the e-mail client application according to one embodiment of the invention will be described. As shown in FIG. 5A, the e-mail client application may also provide a user interface 40B that includes a user interface object 46 for minimizing the display of the organizational policy statement. When selected, the user interface 40C, shown in FIG. 5B, is provided wherein the organizational policy statement is no longer displayed. A user interface object 48 is provided which, when selected, will cause the organizational policy statement to be displayed in the manner shown in FIG. 5A.

According to other aspects of the invention, the e-mail client application 10 may detect that a mouse cursor 50 is "hovering" above the user interface object 48. In response to detecting the hovering mouse cursor, the e-mail client application 10 may provide the user interface 40D shown in FIG. 5C. In this user interface, the organizational policy statement 36 is displayed adjacent to the user interface object 48 and in response to the hovering of the mouse cursor. When the mouse cursor is removed from the user interface object 48, the display of the organizational policy statement 36 may be removed.

Based on the foregoing, it should be appreciated that the various embodiments of the invention include a method, system, apparatus, and computer-readable medium for accessing an organizational policy statement associated with an e-mail folder. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for providing access to policy information associated with an electronic mail message folder, the method comprising:

providing a user interface for navigating among at least one electronic mail folder;

receiving through the user interface a selection of one of the electronic mail folders;

in response to the selection, determining whether the selected electronic mail folder comprises an organizational folder, the organizational folder being associated with at least one electronic mail user; and displaying an organizational policy statement associated with the selected electronic mail folder if the selected electronic mail folder comprises the organizational folder, the organizational policy statement comprising a plurality of words describing a policy applied to the organizational folder and data identifying at least one of the following: an intended use for the selected electronic mail folder and a retention period for electronic mail messages stored in the selected electronic mail folder, wherein a length of the retention period is dependent upon the intended use for the selected electronic mail folder, and wherein the retention period and the intended use are dependent upon at least one employment aspect of the at least one electronic mail user associated with the organizational folder.

2. The computer-implemented method of claim 1, wherein the organizational policy statement is supplied by an administrator of an electronic mail server operative to store the at least one electronic mail folder.

3. The computer-implemented method of claim 1, wherein the organizational policy statement further comprises data identifying the electronic mail folder.

4. The computer-implemented method of claim 1, wherein the organizational policy statement further comprises a selectable link to additional information regarding the organizational policy statement.

5. The computer-implemented method of claim 4, wherein an indicator is displayed within the user interface for each organizational folder that differentiates the organizational folders from other types of folders.

6. The computer-implemented method of claim 5, wherein the user interface further comprises a first user interface object which, when selected, will cause the organizational policy statement to be minimized.

7. The computer-implemented method of claim 6, further comprising receiving an indication that a mouse cursor is hovering over the first user interface object and, in response to receiving the indication, displaying the organizational policy statement.

8. The computer-implemented method of claim 7, wherein the user interface further comprises a second user interface object which, when selected, will cause the minimized organizational policy statement to be displayed.

9. The computer-implemented method of claim 8, further comprising the organizational policy statement if the selected electronic mail folder comprises a sub-folder of the organizational folder.

10. A computer-readable storage medium having computer-executable instructions stored thereon which, when executed by a computer, will cause the computer to:
provide a user interface operative to receive the selection of a user interface object corresponding to an organizational electronic mail folder, the organizational electronic mail folder being associated with at least one electronic mail user; and
in response to receiving the selection of the user interface object, display an organizational policy statement associated with the selected organizational folder, the organizational policy statement comprising a plurality of words describing a policy applied to the organizational folder and data identifying at least one of the following: an intended use for the organizational electronic mail folder and a retention period for electronic mail messages stored in the organizational electronic mail folder, wherein a length of the retention period is dependent upon the intended use for the organizational electronic mail folder, and wherein the retention period and the intended use are dependent upon at least one employment aspect of the at least one electronic mail user associated with the organizational folder.

11. The computer-readable storage medium of claim 10, wherein the computer-executable instructions are further operative to display the user interface object corresponding to the organizational electronic mail folder in a manner that differentiates the user interface object from other user interface objects corresponding to other types of mail folders.

12. The computer-readable storage medium of claim 11, comprising further computer-executable instructions which, when executed by the computer, are operative to cause the computer to:
receive a selection of a sub-folder of the organizational electronic mail folder; and
in response to the selection of the sub-folder, to display the organizational policy statement.

13. The computer-readable storage medium of claim 12, wherein the organizational policy statement further comprises data identifying the organizational electronic mail folder.

14. The computer-readable storage medium of claim 12, wherein the organizational policy statement further comprises a selectable link to additional information regarding the organizational policy statement.

15. The computer-readable storage medium of claim 12, comprising further computer-executable instructions which, when executed by the computer, are operative to cause the computer to display an additional user interface object which, when selected, will cause the organizational policy statement to be minimized.

16. The computer-readable storage medium of claim 12, comprising further computer-executable instructions which, when executed by the computer, are operative to cause the computer to receive an indication that a mouse cursor is hovering over the user interface object and, in response to receiving the indication, to display the organizational policy statement.

17. A computer-implemented method for providing access to policy information associated with an electronic mail message folder, the method comprising:
displaying a user interface for navigating among electronic mail folders;
receiving, through the user interface, a selection of an electronic mail folder;
in response to the selection of the electronic mail folder, determining whether the selected electronic mail folder comprises an organizational folder associated with at least one electronic mail user, wherein an indicator is displayed within the user interface for each organizational folder that differentiates organizational folders from other types of folders;
receiving an indication that a mouse cursor is hovering over a user interface object displayed in the user interface;
in response to receiving the indication, displaying an organizational policy statement associated with the selected electronic mail folder if the selected electronic mail folder comprises the organizational folder, the organizational policy statement including a plurality of words describing a policy applied to the organizational folder and being supplied by an administrator of an electronic mail server operative to store the electronic mail folders, wherein the organizational policy statement comprises data identifying at least one of the following: an intended use for the selected electronic mail folder and a retention period for electronic mail messages stored in the selected electronic mail folder, wherein a length of the retention period is dependent upon the use for the selected electronic mail folder, wherein the retention period and the intended use are dependent upon at least one employment aspect of the at least one electronic mail user associated with the organizational folder, and wherein the displayed organizational policy statement overlays a portion of the user interface and comprises a selectable link to additional information regarding the organizational policy statement;
receiving a request to create at least one sub-folder associated with the organizational folder;
creating the requested at least one sub-folder associated with the organizational folder; and
applying the policy applied to the organizational folder to the requested at least one sub-folder.

* * * * *